United States Patent [19]

Saito et al.

[11] Patent Number: 4,900,951
[45] Date of Patent: Feb. 13, 1990

[54] LATCH-UP RESTORATION CIRCUIT

[75] Inventors: Tadashi Saito; Ichiro Sakamoto; Shizuo Ando; Souhei Yamakawa, all of Kawagoe, Japan

[73] Assignee: Pioneer Electronic Corporation, Tokyo, Japan

[21] Appl. No.: 273,372

[22] Filed: Nov. 18, 1988

[30] Foreign Application Priority Data

Nov. 18, 1987 [JP] Japan .............. 62-176294[U]

[51] Int. Cl.⁴ .......................................... H03K 19/003
[52] U.S. Cl. .................. 307/296.4; 307/246; 307/362; 307/443; 307/480; 364/200
[58] Field of Search ............... 307/433, 234, 479–480, 307/362–363, 525–526, 246, 290, 296.4; 357/42; 361/86, 91, 100–101; 364/200 MS

[56] References Cited

U.S. PATENT DOCUMENTS

| | | | |
|---|---|---|---|
| 4,266,145 | 5/1981 | Amacher et al. | 307/296.4 |
| 4,405,982 | 9/1983 | Ruhnan et al. | 364/200 MS |
| 4,434,403 | 2/1984 | Chang | 307/296.4 |
| 4,464,584 | 8/1984 | Hentzschel et al. | 307/296.4 |
| 4,518,865 | 5/1985 | Iwasaki | 307/296.4 |
| 4,520,418 | 5/1985 | Susi | 307/296.4 X |
| 4,572,966 | 2/1986 | Hepworth | 307/296.4 |
| 4,618,953 | 10/1986 | Daniels et al. | 364/200 MS |
| 4,627,060 | 12/1986 | Huang et al. | 364/200 MS |
| 4,698,829 | 10/1987 | Di Giulio | 377/16 |
| 4,791,317 | 12/1988 | Winnerel et al. | 357/42 X |

Primary Examiner—David Hudspeth
Attorney, Agent, or Firm—Fleit, Jacobson, Cohn, Price, Holman & Stern

[57] ABSTRACT

A latch-up restoration circuit for an electronic circuit generating a signal having a predetermined operating frequency such as a microcomputer, comprises a latch-up sensing device sensing a state that the frequency of the signal generated by the electronic circuit is on the outside of a predetermined frequency range and generating a latch-up detection signal, and a power supply inhibiting device inhibiting supply of a power current to the electronic circuit for a predetermined time period in response to the latch-up detection signal. The electronic circuit is automatically resumed to an initial state and the latch-up phenomenon is removed when the supply of the power current is restarted.

6 Claims, 8 Drawing Sheets

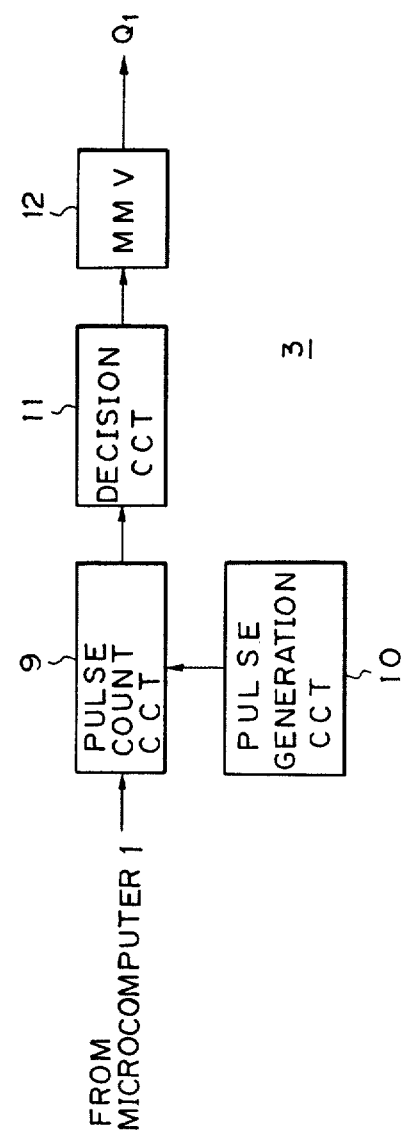

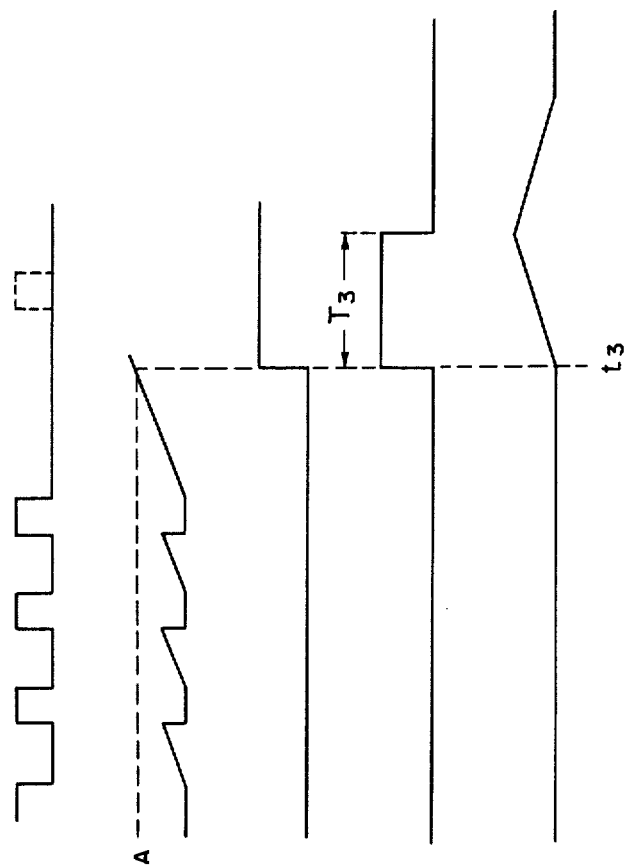

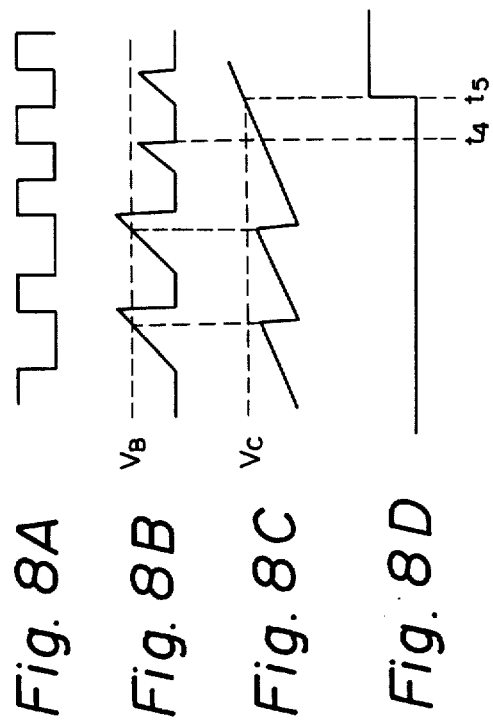

LATCH-UP RESTORATION CIRCUIT

BACKGROUND OF THE INVENTION

1. Field of the Invention

The present invention relates to a latch-up restoration circuit for restoring a latch-up phenomenon generated in an electronic circuit.

2. Description of Background Information

In an electronic circuit having input and output terminals such as a microcomputer, especially in an electronic circuit made up of semiconductor devices having the CMOS (Complementary Metal-Oxide-Semiconductor) structure, it is known that an abnormal phenomenon called "latch-up" is generated when a noise due to the static electricity are applied on the input or output terminal thereof. This abnormal phenomenon called "latch-up" (referred to as latch-up phenomenon hereinafter) is such a phenomenon that the output of the circuit is fixed at a certain state irrespective of the input signal, so that a large current flows through the circuit. Once the latch-up phenomenon occurs, it will continue until the power supply is shut-off, and circuit elements can be destroyed by the excess current. For instance, in the case of a car stereo system equipped with a microcomputer to which a power current is directly supplied from the battery without flowing through a power switch so that the data is held and the reception of various instructions is enabled also during the power current is shut off, the latch-up phenomenon can not be removed by the on-off operations of the power switch in the event that the latch-up phenomenon occurs in the microcomputer. Furthermore, this problem is serious since it may result in the destruction of circuit elements if the malfunction is continued for a long time.

As a solution of this problem, it is conceivable, as illustrated in FIG. 1, to employ a measure such that Zener diodes ZD are inserted between each input or output terminal of a microcomputer M and a circuit point of a reference potential, to cut-off noises applied to each input or output terminal.

This measure is considerably effective for preventing the latch-up phenomenon, because in certain cases the prevention of the latch-up phenomenon is ensured by the insertion of the Zener diodes ZD between four or five particular input/output terminals of the microcomputer M and the reference potential circuit point, depending on the type or characteristic of the microcomputer M.

However, in some types of microcomputer, the prevention of the latch-up phenomenon can not be ensured unless the Zener diodes are inserted between almost all of the input and output terminals thereof and the reference potential point. In such a case, it is necessary to use a number of Zener diodes, and it will cause inconveniences in the cost and production control.

OBJECT AND SUMMARY OF THE INVENTION

The present invention is based on the recognition of the point described above, and an object of the invention is to provide a latch-up restoration circuit which is operative to automatically cancel the latch-up phenomenon when it is generated, without using any noise cut means such as the Zener diodes, so that generation of faults by the latch-up phenomenon is prevented.

A latch-up restoration circuit according to the present invention is configured to generate a latch-up detection signal when a state is detected in which the frequency of a signal having a predetermined operating frequency and outputted from the electronic circuit is on the outside of a predetermined frequency range, and to inhibit the supply of power current to the electronic circuit for a predetermined time period in response to the latch-up detection signal.

BRIEF DESCRIPTION OF THE DRAWINGS

FIGS. 4 and 5 are block diagrams showing other embodiments of the present invention;

FIGS. 7A through 7E, and 8A through 8D are waveform diagrams illustrating the operation of the circuit shown in FIG. 6.

DETAILED DESCRIPTION OF PREFERRED EMBODIMENTS

Embodiments of the present invention will be described with reference to FIGS. 2 through 8D of the accompanying drawings.

Figure 1:
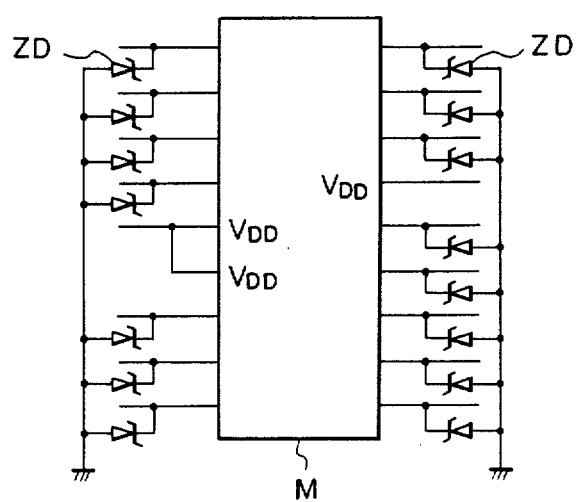
FIG. 1 is a circuit diagram showing a conventional manner of preventing the latch-up phenomenon.
Figure 2:
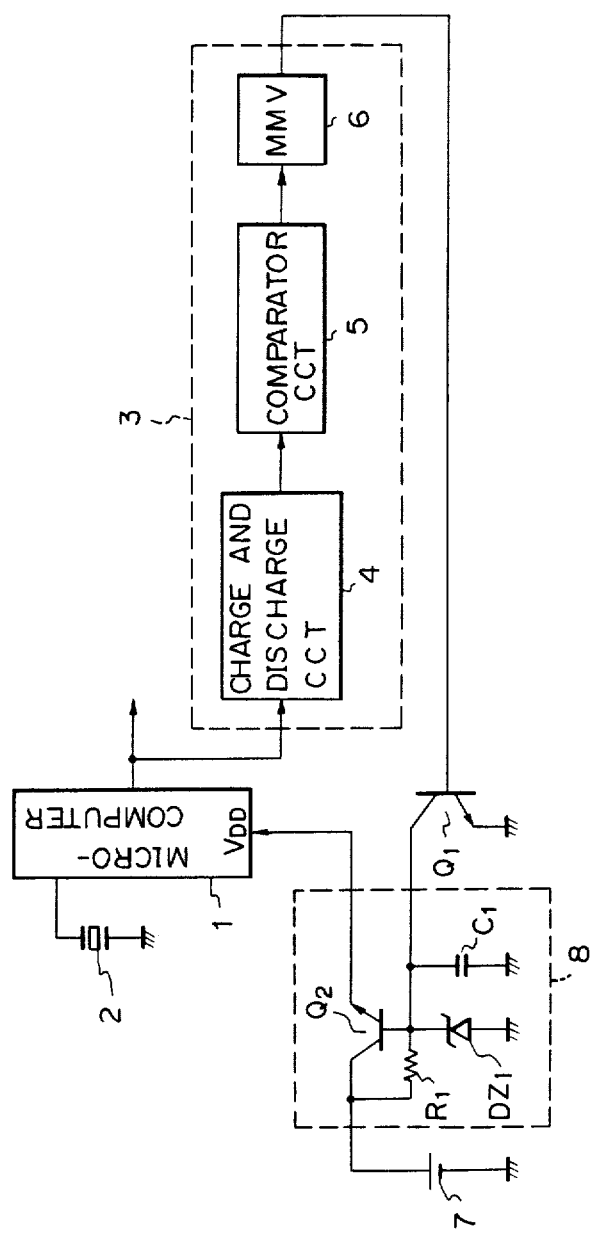
FIG. 2 is a block diagram showing an embodiment of the latch-up restoration circuit according to the present invention.

In FIG. 2, the reference numeral 1 indicates a microcomputer. The microcomputer 1 is made up of various element such as a clock generating circuit where a clock of a predetermined frequency is generated by a quartz oscillator 2, a processor operated by the clock, a ROM, a RAM, and a timing signal generating circuit for generating a timing signal of a predetermined frequency, used as a scan pulse signal for sensing the key operation on a key matrix, or a drive pulse for a dynamic drive of a display part.

If a noise due to the static electricity, for example, is applied on the input/output terminal of the microcomputer 1 and consequently the latch-up phenomenon is generated, regular production of the timing signal will not be performed properly, e.g., the frequency of the timing signal is continuously held too high or too low, or an instantaneous high or low level of the timing signal is maintained continuously.

The timing signal generated by the microcomputer 1 is supplied to a key matrix of a conventional design (not shown), a display drive circuit of a conventional design (not shown), and to a latch-up detection circuit 3.

In the latch-up detection circuit 3, the timing signal is supplied to a charge and discharge circuit 4 made up of an integrating circuit, for example. The charge and discharge circuit 4 is configured so that its output voltage goes up gradually when the instantaneous level of the timing signal becomes low, and the output voltage drops quickly when the instantaneous level of the timing signal becomes high. The output voltage of the charge and discharge circuit 4 is supplied to a comparator circuit 5, where it is compared with a reference voltage Vr, and the comparator circuit 5 produces an output signal of a high level, for example, when the reference voltage Vr is exceeded by the output signal of the charge and discharge circuit 4. The output signal of the comparator circuit 5 is in turn supplied to a trigger input of a monostable multivibrator (simply referred to as MMV hereinafter) 6. The MMV 6 is configured to be triggered by a leading edge of a trigger input, and its output level is turned over for a predetermined period of time $T_1$. The MMV generates a Q output signal which is supplied to the base of a transistor $Q_1$ operating as a power supply inhibiting means.

The transistor $Q_1$ whose emitter is grounded generates a collector output signal, which is supplied to the base of a transistor $Q_2$. An output voltage of a battery 7 is supplied to the transistor $Q_2$ at the collector thereof, and a resistor $R_1$ is connected across the collector and the base of the transistor $Q_2$. Furthermore, the base of the transistor $Q_2$ is connected to the cathode of a zener diode $DZ_1$, while the anode thereof is grounded. In addition, a capacitor C for smoothing operation is inserted between the base of the transistor $Q_2$ and the ground. In this way, a regulated power supply 8 is made up of the circuit elements described above, namely the transistor $Q_2$, the zener diode $DZ_1$, the resistor $R_1$, and the capacitor $C_1$. With this circuit, a regulated voltage whose voltage level is almost the same as the Zener voltage of the Zener diode $DZ_1$ is outputted from the emitter of the transistor $Q_2$ and supplied to a $V_{DD}$ power supply terminal of the microcomputer 1.

Figures 3A, 3B, 3C, 3D, 3E:
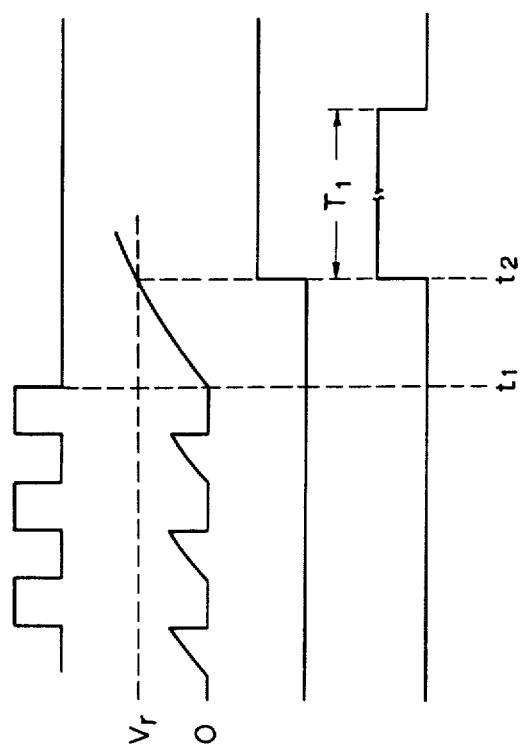
FIGS. 3A through 3E are waveform diagrams illustrating the operation of the circuit shown in FIG. 2.

With the circuit construction described above, if the latch-up phenomenon is generated and the level of the timing signal outputted from the microcomputer 1 is kept at a low level from an instant $t_1$ as illustrated in FIG. 3A, then the output voltage of the charge and discharge circuit 4 goes up gradually. When the output voltage of the charge and discharge circuit 4 exceeds the reference voltage Vr as illustrated in FIG. 8B, the output of the comparator 5 turns to the high level as illustrated in FIG. 3C, and the MMV 6 is triggered so that the latch-up detection signal which comprises a positive pulse is generated as illustrated in FIG. 8D. Since this latch-up detection signal is applied to the base of the transistor $Q_1$, the transistor $Q_1$ is rendered conductive. As a result, the potential at the base of the transistor $Q_2$ becomes substantially equal to the ground potential, and the output voltage of the regulated power supply circuit 8 is reduced, to inhibit the supply of the power current to the microcomputer 1 for the predetermined time period $T_1$. With this operation, the microcomputer 1 is restored to an initial state, so that the latch-up phenomenon is removed.

In the above embodiment, the latch-up phenomenon is detected by sensing the state that the level of the timing signal stays at a low level. However, by appropriately changing the characteristic of the charge and discharge circuit 4 or the comparator circuit 5, the circuit can be modified such that the latch-up phenomenon is detected by sensing such a state that the level of the timing signal stays at a high level, or the frequency of the timing signal becomes too high or too low. In Both of the above described cases, the power supply to the microcomputer 1 can be inhabited for the predetermined time period T1.

FIG. 4 is a block diagram showing another embodiment of the present invention, and showing especially the construction of a latch-up detection circuit 3. This embodiment also includes other circuit elements shown in FIG. 2, namely, the circuit blocks 1, 2, 7, 8 and the transistor $Q_1$. Since the construction of the circuit elements and the mutual connection thereof are the same as those in the circuit shown in FIG. 2, the explanation thereof will not be repeated.

In FIG. 4, the timing signal outputted from the microcomputer 1 is supplied to a reset input terminal of a pulse count circuit 9. Output pulses of a pulse generation circuit 10 is supplied to a count pulse input terminal of the pulse count circuit 9.

The pulse generation circuit 10 is configured to generate a pulse signal having a frequency sufficiently higher than the frequency of the timing signal outputted from the microcomputer 1. Output data of the pulse count circuit 9 is supplied to a decision circuit 11 which is made up of a comparator, for example. The pulse count circuit 9 is configured to compare the output data $d_X$ with two reference data $d_A$ and $d_B$ ($d_A > d_B$) respectively, and to output a high level signal when the output data $d_X$ of the pulse count circuit 9 becomes larger than the reference data $d_A$, or when the peak value of the output data $d_X$ becomes smaller than the reference data $d_B$.

The output of the decision circuit 11 forms a trigger input of a monostable multivibrator (MMV) 12. The MMV 12 is configured to be triggered by a leading edge of the trigger input, and to generate a positive pulse signal for the predetermined time period $T_1$. The output of this MMV 12 is supplied to the base of the transistor $Q_1$ as the latch-up detection signal.

In the above describe arrangement, since the time interval of the resetting of the pulse count circuit 9 is varied in response to the frequency of the timing signal outputted from the microcomputer 1, the peak value of the output data $d_X$ of the pulse count circuit 9 depends on the frequency of the timing signal. In other words, the peak value becomes large when the frequency of the timing signal drops, and the peak value becomes small when the frequency of the timing signal goes up.

In view of the above characteristic, values of the reference data are set so that the peak value of the output data $d_X$ becomes larger than the reference data $d_A$ when the frequency of the timing signal goes down due to the latch-up phenomenon, and the peak value of the output data $d_X$ becomes smaller than the reference data $d_B$ when the frequency of the timing signal goes up due to the latch-up phenomenon. By the setting of the reference data in this manner, the high level signal is outputted from the decision circuit 11 when the output data $d_X$ of the pulse count circuit 9 becomes larger than the reference data $d_A$ when the timing signal is not outputted from the microcomputer 11, or when the frequency of the timing signal drops. As a result, the MMV 12 is triggered to inhibit the power supply to the microcomputer 1 for the predetermined time period $T_1$, as in the case of the circuit shown in FIG. 2. In this way, the latch-up phenomenon is removed.

On the other hand, when the frequency of the timing signal goes up due to the latch-up phenomenon, the peak value of the output data $d_X$ becomes smaller than the reference data $d_B$, and the high level signal is outputted from the decision circuit 11. Thus, the latch-up phenomenon is removed in the same manner as the above case where the frequency of the timing signal drops.

Figure 5:
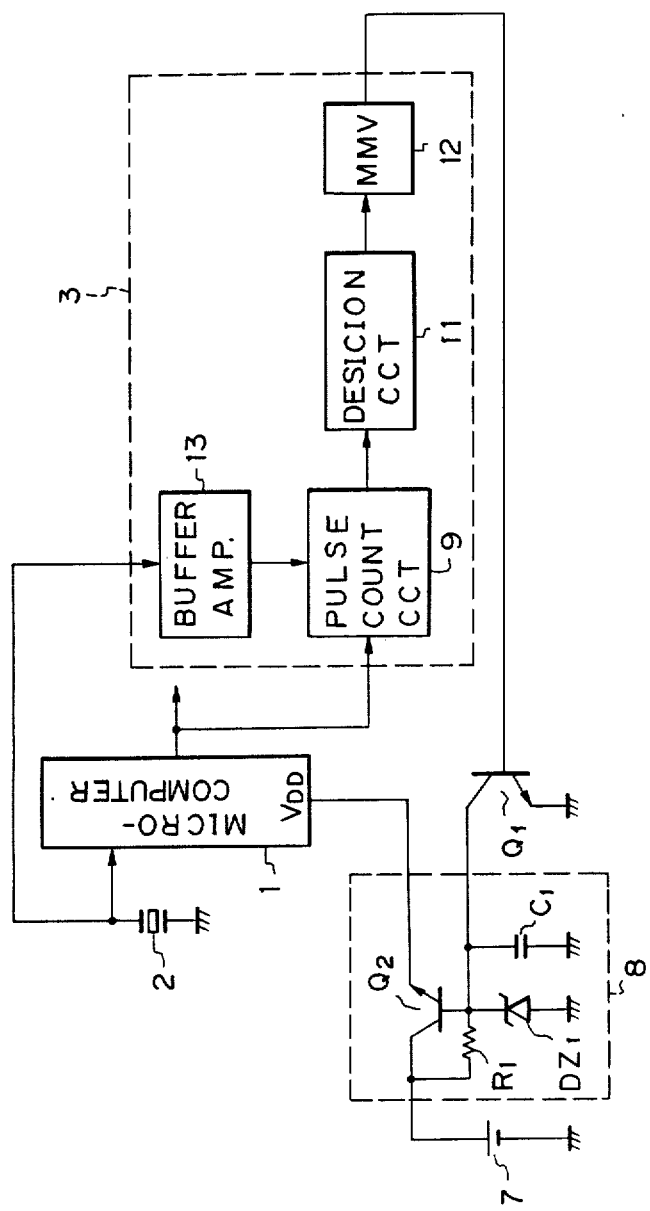

FIG. 5 shows further embodiment of the present invention, in which the microcomputer 1, the quartz oscillator 2, the latch-up detection circuit 3, the battery 7, and the regulated power supply circuit 8 are connected in the same manner as in the circuit shown in FIG. 2. In the latch-up detection circuit 3 of this embodiment, the circuit construction is the same as that of shown in FIG. 4 except that an output signal of a buffer amplifier 13 ia supplied to the reset input terminal of the pulse count circuit 9. An input terminal of the buffer amplifier 13 is connected to a connection point between the microcomputer 1 and the quartz oscillator 2.

With this construction, an operation which is similar to that of the circuit shown in FIG. 4. is performed. However, in this case the circuit construction is simplified because the additional oscillation circuit such as the pulse generating circuit 10 is no more required. Moreover, even if the frequency of the clock signal of the microcomputer 1 is changed by the replacement of the quartz oscillator 2 by a quartz oscillator having different resonant frequency, the frequency at the reset input of the pulse count circuit 9 depends only on the resonant oscillation frequency of the quartz oscillator 2. Therefore, it is unnecessary to change the oscillation frequency of the pulse generating circuit 10 as in the case of the circuit shown in FIG. 4, and this arrangement has an advantage that the selection of the clock frequency of the microcomputer 1 is not subject to any restriction.

Figure 6:
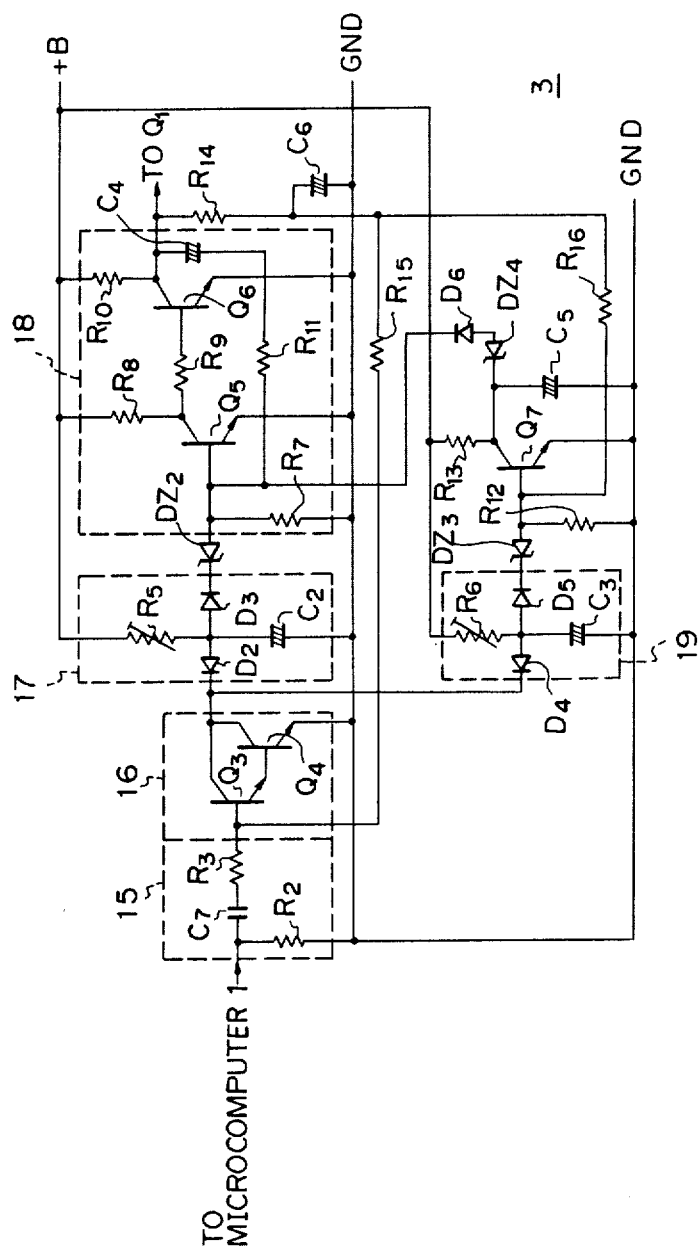
FIG. 6 is a block diagram showing a further embodiment of the present invention.

FIG. 6 shows a still further embodiment of the present invention, and shows only the latch-up circuit 3 as in the case of FIG. 4. Since other circuit elements, namely the blocks 1, 2, 7, and 8 and the transistor $Q_1$ are constructed and mutually connected in the same manner as illustrated in FIG. 2, the explanation thereof will not be repeated. In this embodiment, the timing signal outputted from the microcomputer 1 is supplied to a Darlington circuit 16 which is made up of transistors $Q_3$ and $Q_4$, through a waveform shaping circuit 15 made up of a capacitor $C_7$ and resistors $R_2$ and $R_3$.

An output signal of the Darlington circuit 16 is supplied to a charge and discharge circuit 17 consisting of a resistor $R_5$, diodes $D_2$ and $D_3$, and a capacitor $C_2$, and at the same time supplied to a charge and discharge circuit 19 consisting of a resistor $R_6$, diodes $D_4$ and $D_5$, and a capacitor $C_3$. When the Darlington circuit 16 is turned off, i.e., the instantaneous level of the timing signal is reduced to a low level, electric charge for charging is supplied to the capacitor $C_2$ from the power supply B in the charge and discharge circuit 17, and the voltage charged in the capacitor $C_2$ gradually goes up at an incline corresponding to a time constant defined by the resistance value of the resistor $R_5$ and the capacitance value of the capacitor $C_2$. On the other hand, when the Darlington circuit 16 is turned on, the electric charge of the capacitor $C_2$ is discharged almost instantaneously, and the voltage charged in the capacitor $C_2$ drops almost instantaneously. The voltage charged in the capacitor $C_2$ is supplied to the cathode of the Zener diodes $DZ_2$ through the diode $D_3$ as an output voltage of the charge and discharge circuit 17. A signal derived at the anode of the zener diode $DZ_2$ is supplied to the base of a transistor $Q_5$.

The transistor $Q_5$ forms a monostable multivibrator 18 together with a transistor $Q_6$, resistors $R_7$ through $R_{11}$, and a capacitor $C_4$. When a high level signal is supplied to the base of the transistor $Q_5$, transistors $Q_5$ and $Q_6$ turn on and off respectively, for a predetermined time period $T_3$ corresponding to a time constant determined by the capacitance value of the capacitor $C_4$ and the resistance value of the resistor $R_{11}$. A collector output signal of the transistor $Q_6$ is supplied to the base of the transistor $Q_1$.

On the other hand in the charge and discharge circuit 19, the voltage charged in the capacitor $C_3$ gradually goes up at an incline corresponding to the time constant defined by the resistance value of the resistor $R_6$ and the capacitance value of the capacitor $C_3$. When the Darlington circuit 16 turns on, the voltage charged in the capacitor $C_3$ drops almost instantaneously. The voltage charged in the capacitor $C_3$ is supplied to the cathode of a Zener diode $DZ_3$ through a diode $D_5$ as an output signal of the charge and discharge circuit 19. A signal derived at the anode of the Zener diode $DZ_3$ is supplied to the base of a transistor $Q_7$ of the common emitter arrangement. A resistor $R_{12}$ is inserted between the base of the transistor $Q_7$ and the ground. On the other hand, the power current from the electric power source B is supplied to the collector of the transistor $Q_7$ through a resistor $R_{13}$, and a capacitor $C_5$ is connected between the collector and the ground.

Therefore, when the transistor $Q_7$ turns off, the voltage charged in the capacitor $C_5$ goes up gradually at an incline corresponding to the time constant defined by the resistance value of the resistor $R_{13}$ and the capacitor $C_5$. On the other hand, when the transistor $Q_7$ turns off, the voltage charged in the capacitor $C_5$ drops immediately. This voltage charged in the capacitor $C_5$ is supplied to a cathode of a Zener Diode $DZ_4$. A signal derived at an anode of the Zener diode $DZ_4$ is supplied to the base of a transistor $Q_5$ in the MMV 18 through a diode $D_6$.

In addition, the collector output signal of the transistor $Q_6$ operating as the output signal of the MMV 18 is supplied to a terminal of a capacitor $C_6$ through a resistor $R_{14}$. The other terminal of the capacitor $C_6$ is grounded. The voltage charged in the capacitor $C_6$ is supplied to the base of the transistor $Q_3$ through a resistor $R_{15}$, and at the same time supplied to the base of the transistor $Q_7$ through a resistor $R_{16}$.

With the construction described above, the voltage charged in the capacitor $C_2$ of the charge and discharge circuit 17 gradually goes up in accordance with a time constant defined by the resistance value of the resistor $R_5$ and the capacitance value of the capacitor $C_2$ when the Darlington circuit 16 is turned off. On the other hand, when the Darlington circuit 16 turns on, the voltage drops almost instantaneously. Therefore, the peak value of the voltage charged in the capacitor $C_2$ becomes equal to a value corresponding to the frequency of the timing signal. Similarly, the peak value of the voltage charged in the capacitor $C_3$ of the charge and discharge circuit 19 becomes equal to a value corresponding to the frequency of the timing signal.

Therefore, the time constant of the charge and discharge circuit 17 and the Zener voltage of the Zener diode $DZ_2$ are determined so that the peak value of the voltage charged in the capacitor $C_2$ becomes higher than a predetermined voltage $V_A$ which is slightly higher than the Zener voltage of the Zener diode $DZ_2$ when the frequency of the timing signal is reduced by the latch-up phenomenon. By the determination in such manner, if the frequency of the timing signal is reduced by the generation of the latch-up phenomenon as illustrated in FIG. 7A, and the peak value of the voltage charged in the capacitor $C_2$ becomes higher than the predetermined voltage $V_A$ at an instant $t_3$ as illustrated in FIG. 7B, then the Zener diode $DZ_2$ turns on, and the MMV is triggered by a high level signal derived at the anode of the Zener diode $DZ_2$ as illustrated In FIG. 7C. As a result, the collector output of the transistor $Q_6$ forming the output of the MMV 18 stays at a high level for the time period $T_3$ from an instant $t_3$ as illustrated in FIG. 7D. Thus, the supply of the power current to the microcomputer 1 is inhibited for the predetermined time period $T_3$ as in the case of the circuit shown in FIG. 2, so that the latch-up phenomenon is removed.

In addition, the voltage charged in the capacitor $C_6$ goes up gradually as illustrated in FIG. 7E when the collector output of the transistor $Q_6$ stays at the high level, and is gradually reduced when the collector output turns to the low level. Since the voltage charged in the capacitor $C_6$ is supplied to the base of the transistor $Q_3$ and the base of the transistor $Q_7$, the Darlington circuit 6 and the transistor $Q_7$ are turned on for a time period corresponding to the time constant defined by the resistance value of the resistor 14 and the capacitance value of the capacitor $C_6$ immediately after the inhibition of the power supply to the microcomputer 1 is terminated. With this feature, although the timing signal is not produced immediately after the inhibition of the power supply to the microcomputer 1 is terminated, the power supply will not be inhibited again by an erroneous triggering of the MMV 18.

On the other hand, the time constant in the charge and discharge circuit 19 and the Zener voltage of the Zener diode $DZ_3$ is determined so that the peak value of the voltage charged on the capacitor $C_3$ of the charge and discharge circuit 19 becomes higher than a predetermined voltage $V_B$ which is slightly higher than the Zener voltage of the Zener diode $DZ_3$ when the frequency of the timing signal is normal, and the peak value becomes lower than the predetermined voltage $V_B$ when the frequency of the timing signal goes up due to the occurrence of the latch-up phenomenon.

By this feature, the peak value of the voltage charged in the capacitor $C_3$ becomes higher than the voltage $V_B$ when the frequency of the timing signal is normal, so that the Zener diode $DZ_3$ is turned on, and the high level signal is supplied to the base of the transistor $Q_7$. As a result, conduction of the transistor $Q_7$ occurs at a frequency equal to that of the timing signal, and the voltage charged in the capacitor $C_5$ drops almost instantaneously at the frequency equal to that of the timing signal.

On the other hand, if the peak value of the voltage charged in the capacitor $C_3$ is reduced to be lower than the predetermined voltage $V_B$ at an instant $t_4$ as illustrated in FIG. 8B when the frequency of the timing signal goes up as illustrated in FIG. 8A due to the occurrence of the latch-up phenomenon, then the high level signal is not derived at the anode of the Zener diode $DZ_3$. As a result, the transistor $Q_7$ stays at the off state, and the voltage charged in the capacitor $C_5$ does not fall down. Instead, it gradually goes up at an incline corresponding to the time constant defined by the capacitance of the capacitor $C_5$ and the resistance of the resistor $R_{13}$.

Therefore, values of the capacitor $C_5$ and the resistor $R_{13}$ and the Zener voltage of the Zener diode $DZ_4$ are set so that the peak value of the voltage charged in the capacitor $C_5$ becomes lower than the predetermined voltage $V_c$, which is slightly higher than the Zener voltage of the Zener diode $DZ_4$, when the transistor $Q_7$ turns on at intervals equal to the frequency of the timing signal, and the peak value of the voltage charged in the capacitor $C_5$ becomes higher than the voltage $V_c$ when the frequency of the timing signal goes up due to the occurrence of the latch-up phenomenon. By the setting of the capacitance and resistance values and the Zener voltage in that way, the voltage charged in the capacitor $C_5$ becomes higher than the voltage $V_c$, at an instant $t_5$, when the frequency of the timing signal goes up. As a result, the Zener diode $DZ_4$ is turned on, and a high level signal is derived at its anode. This allows the supply of the high level signal to the base of the transistor $Q_5$, causing the trigger of the MMV 18. Consequently, the supply of the power current to the microcomputer is inhibited for the time period of $T_3$, and the latch-up is removed.

In the above described embodiment, the latch-up phenomenon is detected by using the timing signal outputted from the microcomputer 1. However, if the system equipped with the microcomputer is constructed such that the timing signal is not produced when devices controlled by the microcomputer are not in operation, it is only necessary to alter the program of the microcomputer so that a signal for detecting the latch-up phenomenon is outputted independently of the timing signal. On the other hand, if a microcomputer is newly put out, it is suitable to equip the microcomputer with a terminal for observing the latch-up phenomenon, so that a signal solely for the detection of the latch-up phenomenon which is similar to the timing signal is outputted from that terminal. By using this signal, the latch-up phenomenon can be detected in the same manner as described.

As specifically described, in the latch-up restoration circuit according to the present invention a latch-up detection signal is generated when the frequency of a signal outputted from an electronic circuit is on the outside of a predetermined frequency range, and the power supply to the electronic circuit is suspended in response to the latch-up detection signal for a predetermined period of time. Thus, the electronic circuit is automatically resumed to an initial state, so that generation of faults due to the latch-up phenomenon is surely prevented.

What is claimed is:

1. A latch-up restoration circuit for an electronic circuit generating a signal having a predetermined operating frequency, comprising:
   a latch-up sensing means for sensing a state that the frequency of said signal generated by said electronic circuit is on the outside of a predetermined frequency range and generating a latch-up detection signal; and
   a power supply inhibiting means for inhibiting supply of a power current to said electronic circuit for a predetermined time period in response to said latch-up detection signal.

2. A latch-up restoration circuit as set forth in claim 1, wherein said latch-up sensing means comprises a charge and discharge circuit performing a charge and discharge operation in response to an instantaneous level of said signal from said electronic circuit, and a comparator circuit comparing an output voltage of said charge and discharge circuit with a reference voltage, and generating said latch-up detection signal when said output voltage becomes larger than said reference voltage.

3. A latch-up restoration circuit as set forth in claim 1, wherein said latch up sensing means comprises a pulse signal generating means for generating a pulse train signal having a predetermined pulse interval, a pulse count means for counting number of pulses of said pulse train signal, said pulse count means being reset by said signal from said electronic circuit, and a decision means for comparing an output data of said pulse count means with a reference data and generating said latch-up detection signal when said output data becomes larger than said reference data.

4. A latch-up restoration circuit as set forth in claim 1, wherein a clock signal is supplied to said electronic circuit, and wherein said latch up sensing means comprises a pulse count means for counting number of pulses of said clock signal, said pulse count means being reset by said signal from said electronic circuit, and a decision means for comparing an output data of said pulse count means with a reference data and generating said latch-up detection signal when said output data becomes larger than said reference data.

5. A latch-up restoration circuit as set forth in claim 1, wherein said latch-up sensing means comprises a first charge and discharge circuit performing a charge and discharge operation in response to an instantaneous level of said signal from said electronic circuit, a first voltage generating circuit generating said latch-up detection signal when an output voltage of said first charge and discharge circuit becomes larger than a first reference voltage, a second charge and discharge circuit performing a charge and discharge operation in response to the instantaneous level of said signal from said electronic circuit, and a second voltage generating circuit generating said latch-up detection signal when an output voltage of said second charge and discharge circuit becomes smaller than a second reference voltage.

6. A latch-up restoration circuit as set forth in claim 1, further comprising means for suspending the operation of said latch-up sensing means for a time period after said predetermined time period for inhibiting the supply of the power current is terminated.

* * * * *